United States Patent [19]

Sano

[11] Patent Number: 5,287,405
[45] Date of Patent: Feb. 15, 1994

[54] CALLED PARTY RESPONSE DETECTING APPARATUS

[75] Inventor: Yoshiki Sano, Kanagawa, Japan

[73] Assignee: Tamura Electric Works, Ltd., Tokyo, Japan

[21] Appl. No.: 636,859

[22] Filed: Jan. 2, 1991

[30] Foreign Application Priority Data

Feb. 21, 1990 [JP] Japan .................................... 2-38413

[51] Int. Cl.⁵ .......................................... H04M 11/00
[52] U.S. Cl. .................... 379/386; 379/372; 379/377
[58] Field of Search .................. 379/97, 98, 93, 96, 379/257, 386, 372, 377, 381, 382

[56] References Cited

U.S. PATENT DOCUMENTS

| | | |
|---|---|---|
| 4,686,699 | 8/1987 | Wilkie .................................... 379/97 |
| 4,696,031 | 9/1987 | Freudberg et al. .................... 379/97 |
| 4,811,386 | 3/1989 | Sano et al. . | |
| 5,109,409 | 4/1992 | Bomgardner et al. .............. 379/257 |

*Primary Examiner*—Wing F. Chan
*Assistant Examiner*—Stella L. Woo
*Attorney, Agent, or Firm*—Townsend and Townsend Khourie and Crew

[57] ABSTRACT

A called party response detecting apparatus of a terminal equipment includes a plurality of filter units, a determining unit, and an analyzing unit. The filter units are commonly connected to an input side and detects specific frequency components included in a plurality of signal tones coming from a telephone line. The determining unit checks the presence/absence of each output from the filter units for each fundamental period to determine a signal type on the basis of a predetermined output pattern. The analyzing unit analyzes various signal tones and a called party response on the basis of occurrences of signal type outputs during a predetermined time period of the determining unit.

12 Claims, 9 Drawing Sheets

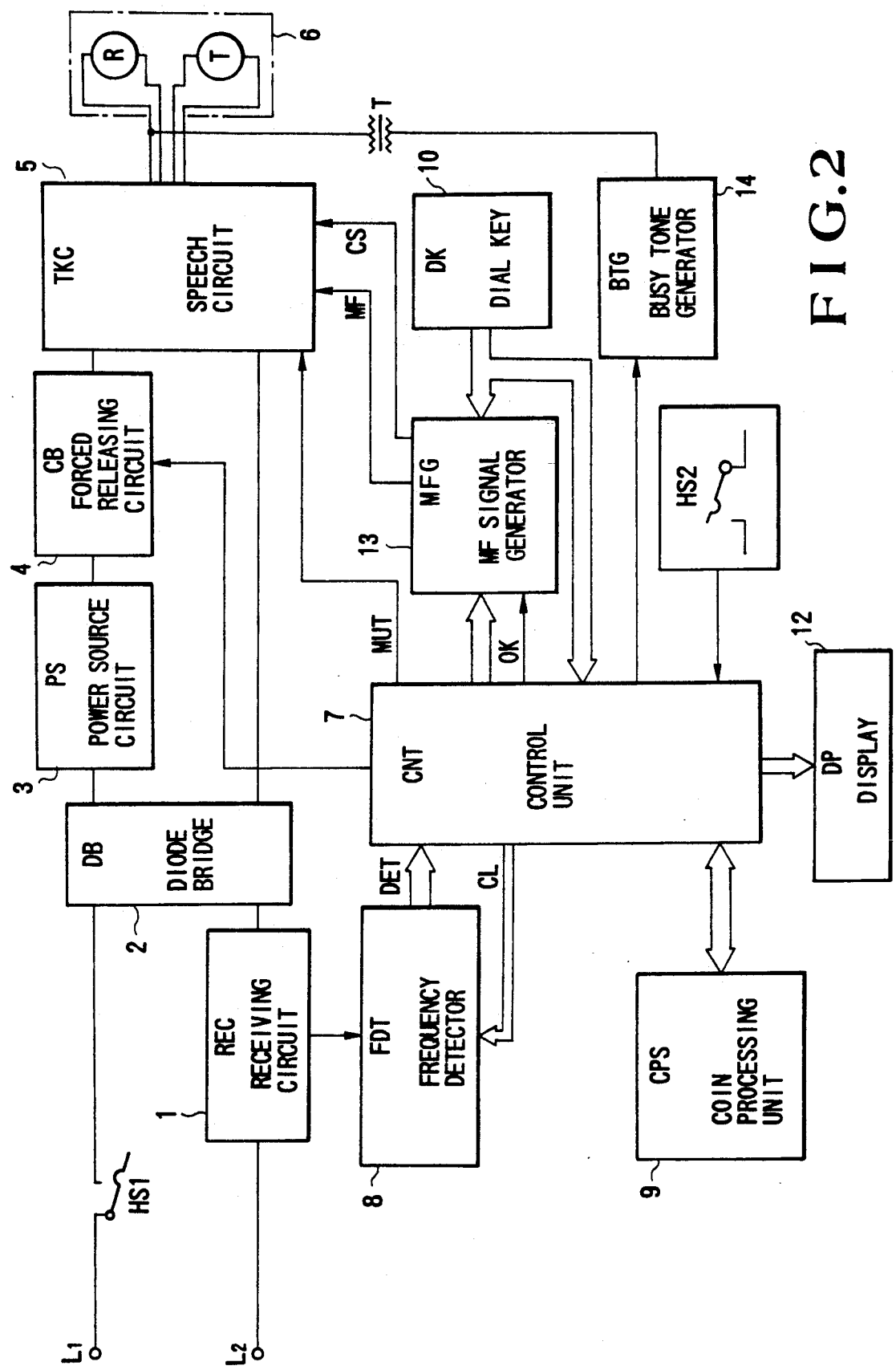
F I G. 2

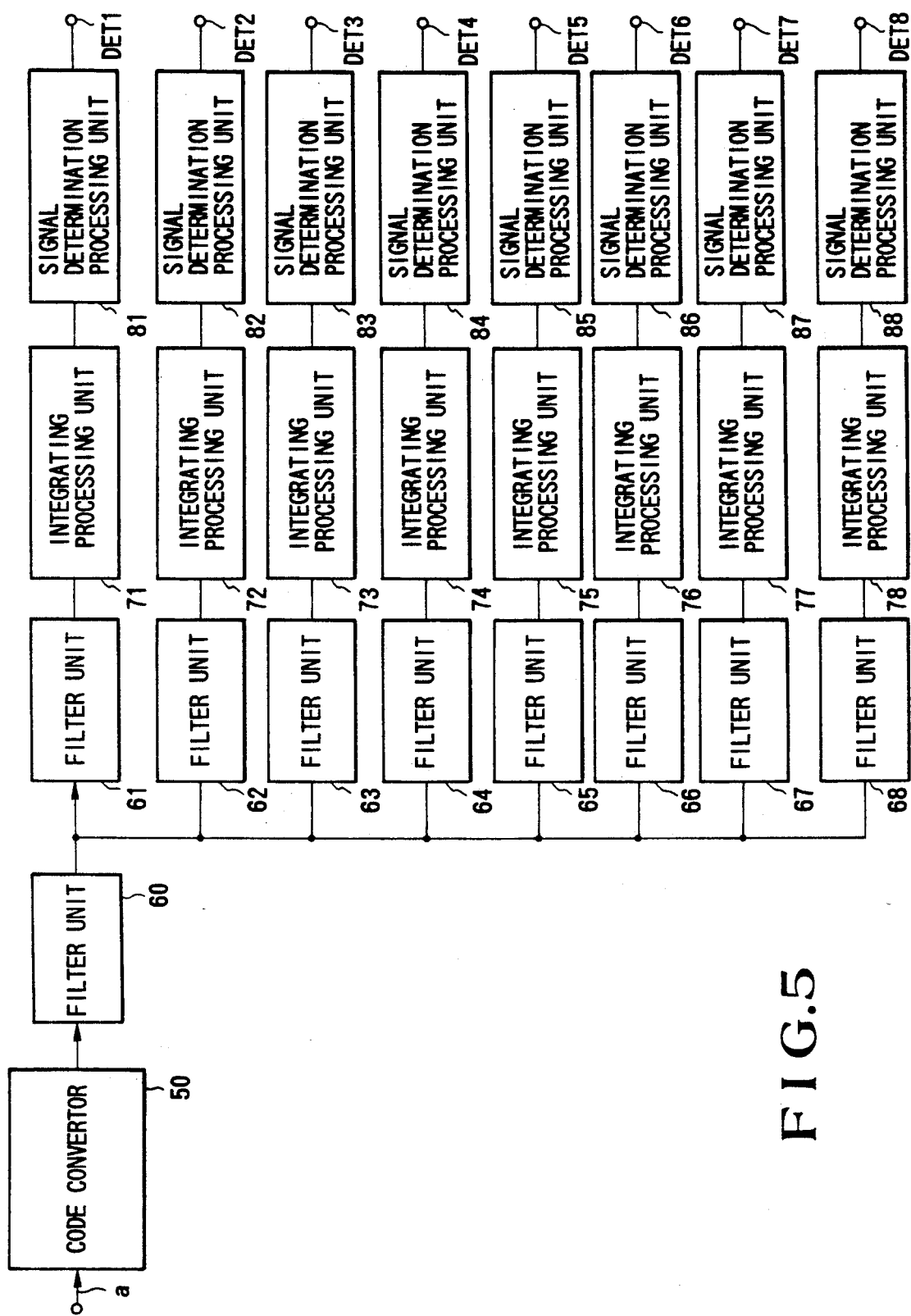
F I G. 5

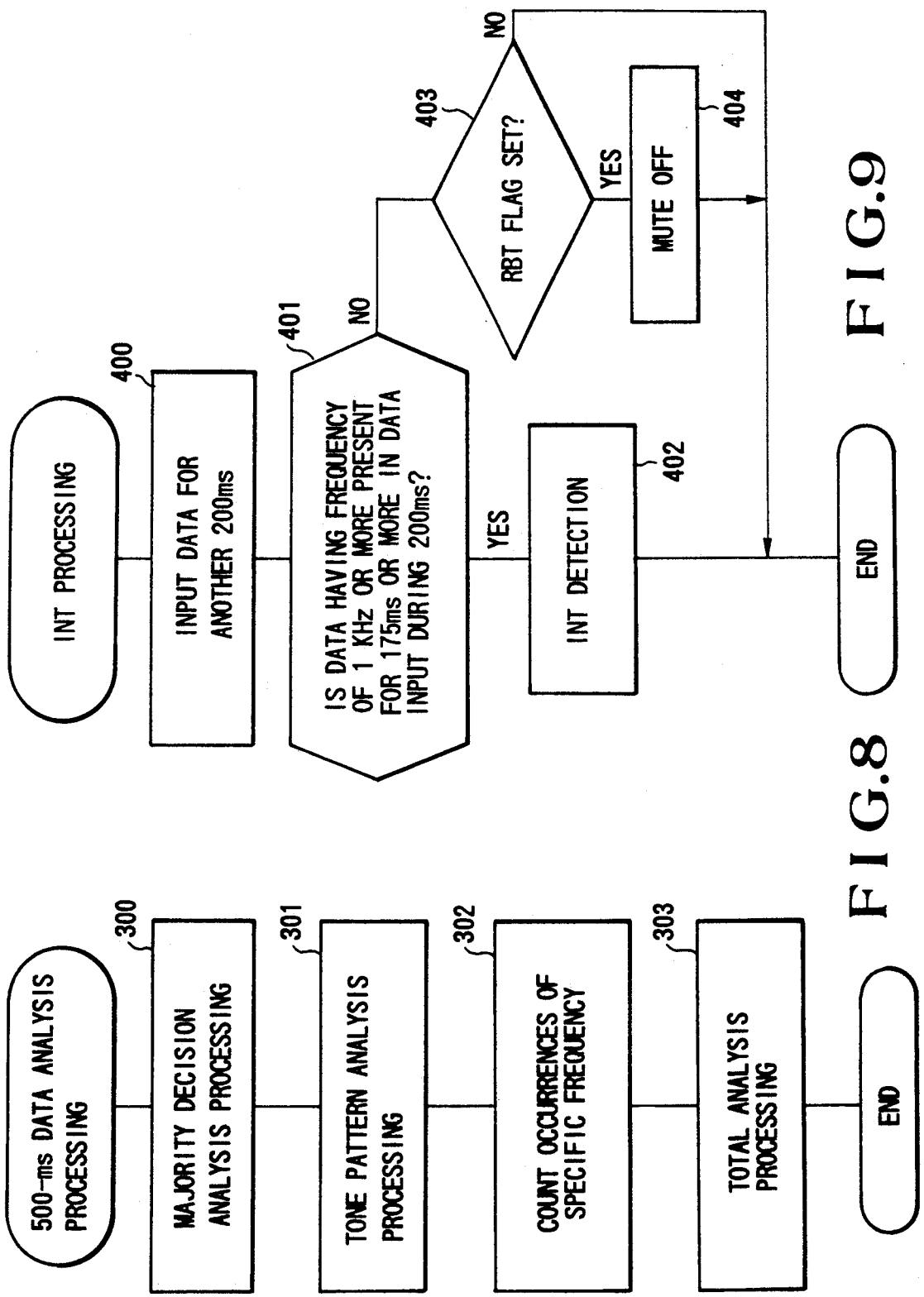

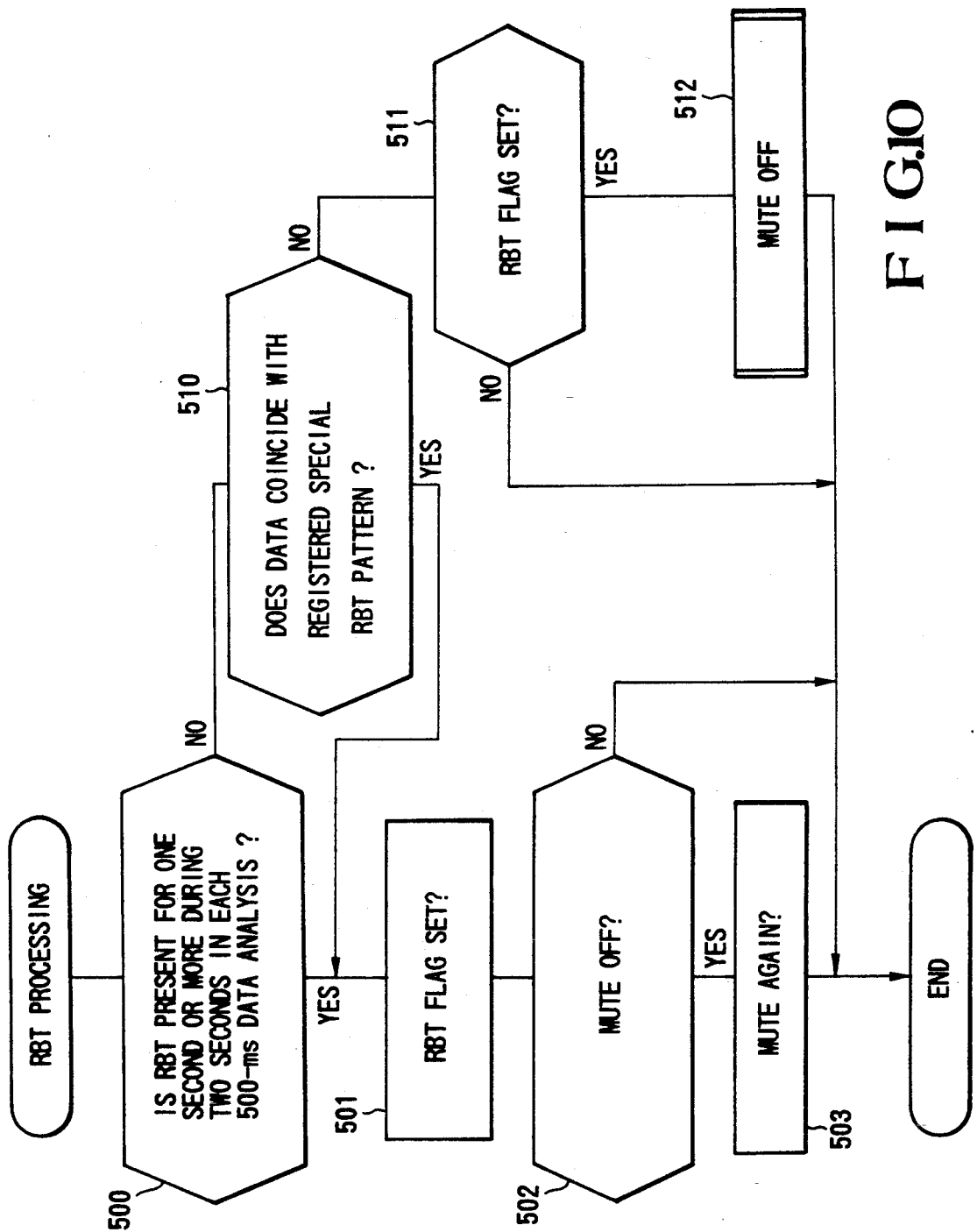

CALLED PARTY RESPONSE DETECTING APPARATUS

BACKGROUND OF THE INVENTION

The present invention relates to a called party response detecting apparatus of a terminal equipment connected to a telephone line to which a signal representing a called party response is not sent.

A conventional destination detecting apparatus of a terminal equipment of this type (Ex. U.S.P. 4,811,386), detects each specific frequency component included in various types of signal tones coming from a telephone line and monitors the duration of each detection output. If a specific frequency continues for a predetermined time period, the apparatus determines a signal tone corresponding to this condition. If any frequency component does not correspond to various types of signal tones, the apparatus determines that the signal is a destination voice obtained by a called party response.

In such a conventional system however, various signal tone data coming from a telephone line are input in real time and compared with a pattern of a predetermined ON/OFF signal length to recognize various signal tones. If noise is sent to the telephone line, therefore, the various signal tones become unstable to immediately deform the recognition pattern, thereby disabling identification. As a result, since the various signal tones cannot ba identified from a called party response, the called party response cannot be correctly detected.

SUMMARY OF THE INVENTION

It is an object of the present invention to provide a called party response detecting apparatus capable of correctly detecting a called party response.

In order to achieve the above object of the present invention, there is provided a called party response detecting apparatus of a terminal equipment connected to a telephone line from which a signal representing a called party response is not sent, comprising a plurality of filter units, commonly connected to an input side, for detecting specific frequency components included in a plurality of signal tones coming from the telephone line, determining means for checking the presence/absence of each output from the filter units for each fundamental period to determine a signal type on the basis of a predetermined output pattern, and analyzing means for analyzing various signal tones and a called party response on the basis of occurrences of signal type outputs during a predetermined time period of the determining means.

The analyzing means is constituted by a partial analyzing means for determining partial signal types by partial analyses performed by a plurality of unit analyzing means obtained by dividing the predetermined time period and a total analyzing means for determining a representative signal type on the basis of temporary signal type outputs from the partial analyzing means.

Each partial analyzing means determines a signal type output having a maximum count value supplied from the determining means as a temporary signal type.

The total analyzing means determines a representative type by decision of majority of the temporary signal type outputs from the partial analyzing means.

The total analyzing means determines the representative signal type on the basis of generated patterns of the temporary signal type outputs from the partial analyzing means.

The apparatus further includes a memory unit for storing the presence/absence of each output from the filter units for each fundamental period, and the total analyzing means determines a total representative signal type on the basis of at least two factors of the majority decision result of the temporary signal outputs from the partial analyzing means, the generated patterns, and the contents of the memory unit.

The apparatus further comprises a continuous signal detecting means for detecting continuation of a logical OR output from the filter units for a predetermined time period to allow the analyzing means to perform an analysis operation for a predetermined time period.

Each partial analyzing means temporarily determines noise when the maximum count value is a predetermined value or less.

Each partial analyzing means determines a specific signal type as a temporary signal type when a signal type having the maximum count value is toneless and a count value of the specific signal type is a predetermined value or more.

The total analyzing means determines a representative signal type on the basis of predetermined conditions of combinations when the decision by majority is split.

The apparatus further comprises a checking means for performing a check corresponding to a signal type of a signal tone determined by the analyzing means.

The checking means has a special data pattern for each signal type and unconditionally continues the processing for a signal type when the special data pattern coincides with a generated pattern of the signal type obtained upon checking.

A plurality of filter units are constituted by digital filters using DSPs.

Specific frequency components included in a plurality of signal tones coming from a telephone line are checked in units of fundamental periods, and their signal types are determined on the basis of predetermined output patterns. Various signal tones and a called party response are analyzed in accordance with generation frequencies of signal type outputs within a predetermined time period. Temporary signal types are determined by a plurality of partial analyses performed by dividing the predetermined time period, and a representative signal type is determined on the basis of the temporary signal type outputs.

BRIEF DESCRIPTION OF THE DRAWINGS

FIG. 2 is a block diagram showing the public telephone set shown in FIG. 1;

FIG. 5 is a block diagram showing a frequency detector arranged by using DSPs; and FIGS. 6 to 11 are flow charts for explaining operations of the apparatus of the present invention.

DETAILED DESCRIPTION OF THE PREFERRED EMBODIMENT

Figure 1:
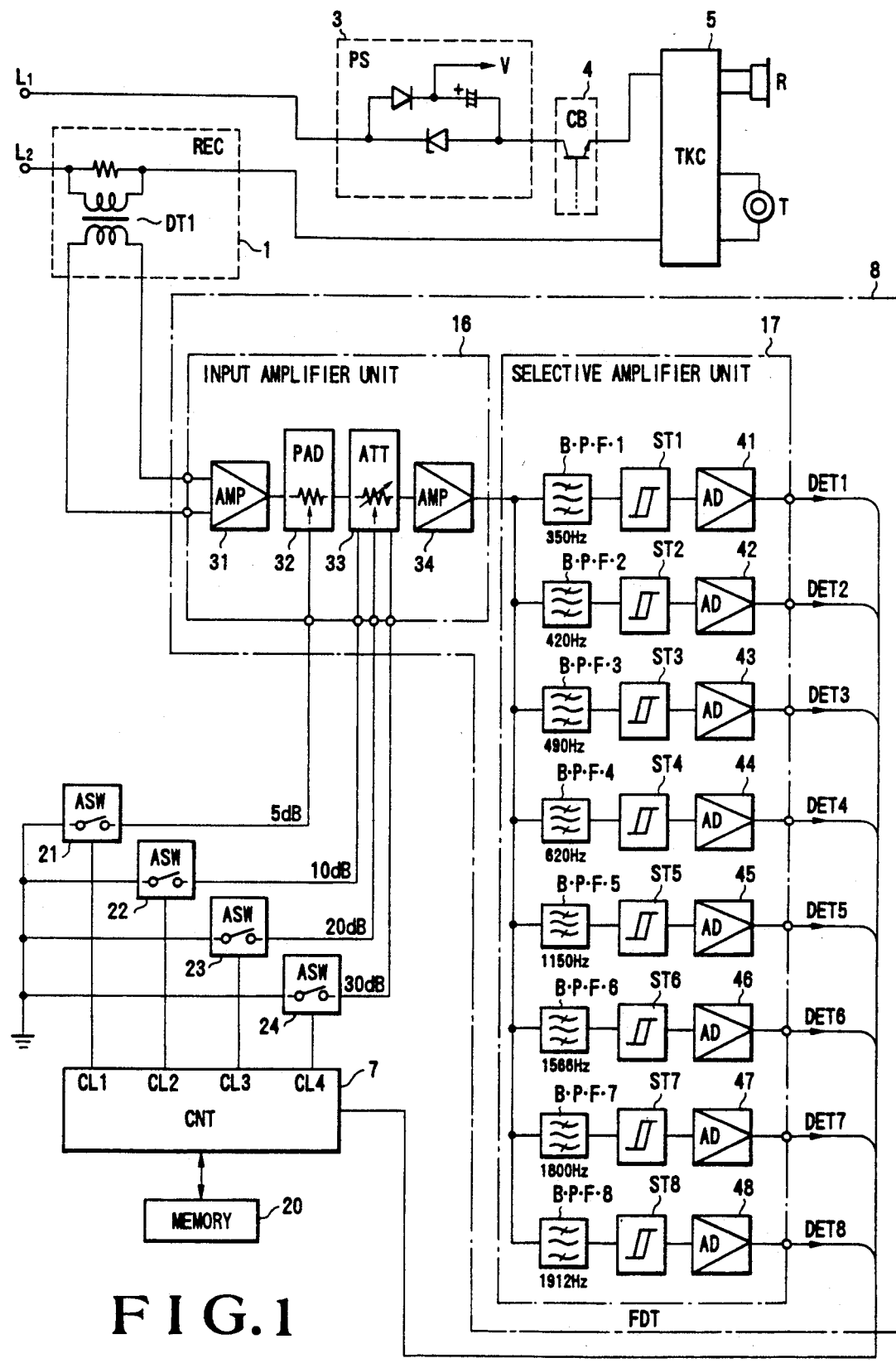
FIG. 1 is a block diagram showing an embodiment of a public telephone set using a called party response detecting apparatus according to the present invention.

The present invention will be described in detail below with reference to the accompanying drawings.

FIG. 2 shows a schematic arrangement of a public telephone set using a called party response detecting apparatus according to the present invention. Referring to FIG. 2, a hook switch HS1, a receiving circuit (to be referred to as a REC hereinafter) 1, a diode bridge (to be referred to as a DB hereinafter) 2, a power source circuit (to be referred to as a PS hereinafter) 3, and a forced releasing circuit (to be referred to as a CB hereinafter) 4 form a speech loop with respect to line terminals L1 and L2 connected to a telephone line from a switching system. A speech circuit (to be referred to as a TKC hereinafter) 5 having a transmission amplifier and a reception amplifier and connected to a transmitter T and a receiver R of a handset 6 is also connected to the line terminals L1 and L2.

A control unit (to be referred to as a CNT hereinafter) 7 constituted by, e.g., a processor (to be referred to as a CPU hereinafter) such as a microprocessor executes determination operations on control in accordance with outputs from, e.g., a frequency detector (to be referred to as an FDT hereinafter) 8, a coin processing unit (to be referred to as a CPS hereinafter) 9, a dial key (to be referred to as a DK hereinafter) 10, and a hook switch HS2, thereby controlling the CPS 9, a display (to be referred to as a DP hereinafter) 12, an MF signal generator (to be referred to as an MFG hereinafter) 13 for generating a voice mixed frequency (to be referred to as an MF hereinafter) signal, the TKC 5, the CB 4, and the like.

Note that the MFG 13 operates in response to an output from the DK 10 and the control of the CNT 7. That is, only when a permission signal OK is supplied from the CNT 7, the MFG 13 generates the MF signal, supplies a control signal CS to the TKC 5, and transmits the MF signal as a dial signal via the TKC 5. In addition, when monitor information is to be transmitted to a maintenance center or the like, the MFG 13 performs dial calling to a specific address of the maintenance center or the like as described above and then transmits the monitor information by the MF signal through the same path.

When the hook switch HS1 is switched on by an off-hook operation to close a DC loop via the TKC 5 and a loop current having a predetermined polarity is flowed by the DB 2 accordingly, the PS 3 charges a capacitor to supply power to each section as a voltage V of the capacitor.

When an off-hook operation is performed in the pre-loop system, therefore, since the DC loop is closed and the CNT 7 transmits the permission signal OK in accordance with the output from the CPS 9 caused by insertion of coins, dial calling by the DK 10 is enabled to make it possible to start conversation when a called party responds.

Even when a called party responds, however, a charging signal such as a reversing pulse is not sent but a called party response is detected on this telephone line. In order to detect the called party response, therefore, signals coming from the telephone line via the REC 1 using a transformer or the like are detected in units of frequency components by the FDT 8, and the CNT 7 checks whether the detection output continues for a predetermined time period. In accordance with the monitoring result, the CNT 7 performs determination between various signal tones and a voice from a destination. The CNT 7 detects a called party response upon determination of the destination voice and controls the CPS 9 to store coins accordingly. In addition, the CNT 7 disables a mute signal MUT with respect to the TKC 5 and releases an inoperative state of the transmitter T. If inserted and queued coins become insufficient, the CNT 7 controls the CB 4 to open the DC loop for a predetermined time period and releases a switching system to forcedly release the call.

In accordance with the type of DP 12, the CNT 7 displays a storage state of inserted coins. In addition, the CNT 7 has a self-diagnosis function to perform self diagnosis in accordance with the output from the hook switch HS2 corresponding to an off-hook operation. When the CNT 7 detects disconnection or the like caused by, e.g., a full storage safe in the CPS 9, coin stacking, and robbery of the handset 6, it causes the DP 12 to display "unusable" in accordance with the situation.

The FDT 8 has a minimum detection level of each frequency component which can be varied by a control signal CL. Therefore, the CNT 7 controls the FDT 8 in accordance with conditions to set the minimum detection level to be a desired value.

A busy tone generator (to be referred to as a BTG hereinafter) 14 for locally generating a busy tone is provided in the arrangement. The BTG 14 supplies a local busy tone to the receiver R of the handset 6 via a transformer T under the control of the CNT 7, thereby acknowledging to a user that the line is busy.

FIG. 1 shows a detailed arrangement of a public telephone set using the called party response detecting apparatus according to the present invention. In FIG. 1, the same reference numerals as in FIG. 2 denote the same parts and a detailed description thereof will be omitted. Referring to FIG. 1, reference numeral 16 denotes an input amplifier unit; 17, a selective amplifier unit; 20, a memory; and 21 to 24, analog switches (to be referred to as ASWs hereinafter), and reference symbol DT1 denotes a pickup transformer. In the input amplifier unit 16, reference numeral 31 denotes an input signal amplifier (to be referred to as an AMP hereinafter); 32, a 5-dB pad (to be referred to as a PAD hereinafter); 33, a variable attenuator (to be referred to as an ATT hereinafter) for varying the level of an input signal in units of 10, 20, and 30 dB; and 34, a signal amplifier (to be referred to as an AMP hereinafter). In the selective amplifier 17, reference symbols B.P.F.1 to B.P.F.8 denote band-pass filters (to be referred to as a B.P.Fs hereinafter); and ST1 to ST8, Schmidt trigger circuits, and reference numerals 41 to 48 denote rectifying amplifiers (to be referred to as ADs hereinafter).

A signal coming from a telephone line is amplified by the pickup transformer DT1 and supplied to the AMP 31 constituted by a hybrid IC (HIC). The signal is amplified by the AMP 31 and attenuated to be a proper level by the PAD 32 and the ATT 33. In this case, the signal is variably attenuated to be a proper level by control signals CL1 to CL4 from the CPU 1.

TABLE 1

| Control Signal | Signal Level (−dBm) | | | | | | | |
|---|---|---|---|---|---|---|---|---|
| | 20 | 25 | 30 | 35 | 40 | 45 | 50 | 55 |
| CL1 | 0 | 1 | 0 | 1 | 0 | 1 | 0 | 1 |
| CL2 | 0 | 0 | 1 | 1 | 0 | 0 | 0 | 0 |
| CL3 | 0 | 0 | 0 | 0 | 1 | 1 | 0 | 0 |
| CL4 | 0 | 0 | 0 | 0 | 0 | 0 | 1 | 1 |
| Level | 0 | 1 | 2 | 3 | 4 | 5 | 6 | 7 |

As shown in Table 1, this variable level can be switched from −20 dBm to −55 dBm in units of 5 dBm. For example, if the input signal level is −30 dBm, only the control signal CL2 is turned on while other signals are kept off. As a result, a proper level signal is supplied to the AMP 34, and a signal at a predetermined level is supplied to the band-pass filter B.P.F in the next stage.

The band-pass filter B.P.F is constituted by eight filters having different center frequencies. When a frequency is detected by each filter, the detected frequency is supplied to the CNT 7 via a corresponding one of the Schmidt trigger circuits ST1 to ST8 and a corresponding one of the ADs 41 to 48 in the next stage.

That is, if 350 Hz and 420 Hz are detected at the same time, these frequencies are supplied to the terminals DET1 and DET2, respectively.

Figure 3:
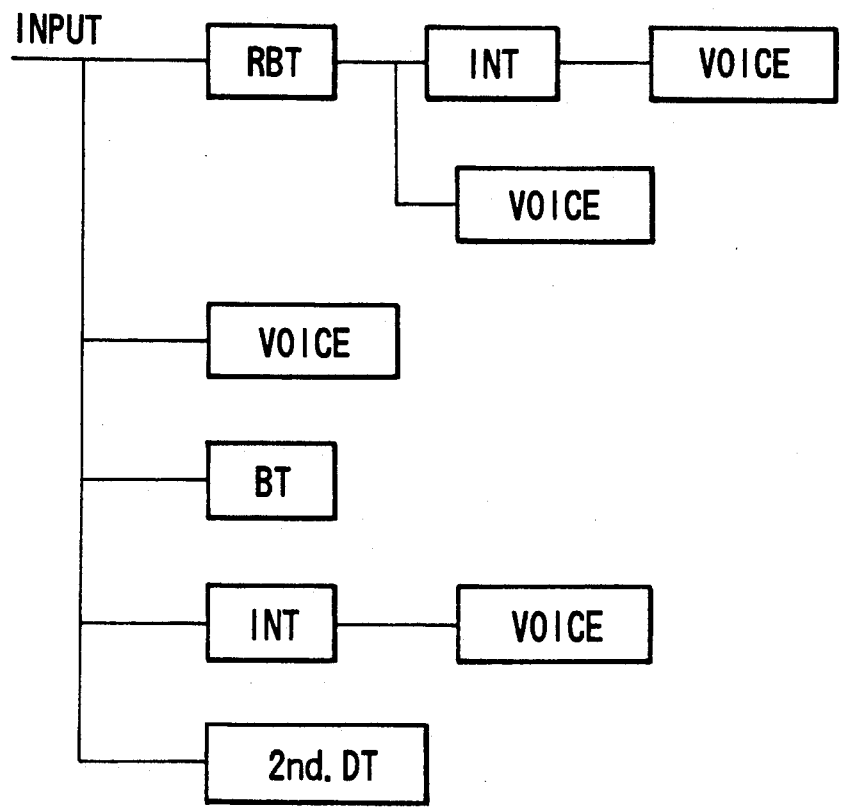
FIG. 3 is a view for explaining an order of sending various signal tones coming from a switching system after a predetermined dial signal is sent.

FIG. 3 explains an order of sending various signals to be transmitted from a switching system to a public telephone set after a selection signal (dial signal) is supplied.

Referring to FIG. 3, reference symbol RBT denotes a ringback tone; INT, intercept tone; BT, a busy tone; 2nd.DT, a second dial tone; and VOICE, a voice signal. When coins are stored, i.e., a charge call is to be performed, the RBT is always transmitted. Therefore, a called party response is detected after the RBT is detected. When the RBT is received, the INT and the VOICE must be sometimes identified from each other immediately after the reception. This is because the former tone represents a no-charge call, and the latter tone represents a charge call.

Table 2 shows frequencies, levels, and transmissions periods of various signal tones coming from the telephone line, and Table 3 shows combinations of the signal tones and the B.P.Fs.

TABLE 2

| Type | Frequency (Hz) | Transmission Level (dBm) | Transmission Period (sec) |
|---|---|---|---|
| DT | ① 350 + 440<br>② 600 × 120 | −13 | Continuous |
| RBT | ① 400<br>② 400 + 480<br>③ 500 | −19 | 2 ON, 4 OFF<br>OR<br>1 ON, 3 OFF |
| BT | ① 480 + 620<br>② 600 × 120 | −24 | 0.5 ON, 0.5 OFF |
| INT | 950/1450/1,800 | −19 | Transmitted by 0.30 N sequentially from low frequency |

TABLE 3

| Type Frequency (Hz) | DT ① | DT ② | RBT ① | RBT ② | RBT ③ | BT ① | BT ② | INT | VOICE |
|---|---|---|---|---|---|---|---|---|---|
| 350 | • | | | | | | | | |
| 420 | | • | • | • | | | | | • |
| 490 | | | • | • | • | | | | • |
| 620 | | • | | | | • | • | | • |
| 1,150 | | | | | | | | • | • |
| 1,566 | | | | | | | | • | • |
| 1,800 | | | | | | | | • | • |
| 1,912 | | | | | | | | | • |

In this manner, this called party response detecting apparatus detects frequency components listed in the above tables and coming from the telephone line in accordance with the transmission level and the transmission period, thereby identifying various types of signal tones and a voice signal.

Figure 4:
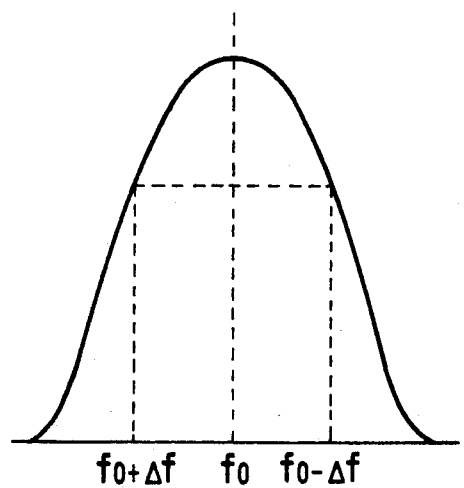
FIG. 4 is a graph showing characteristics of a band-pass filter.
Figure 6:
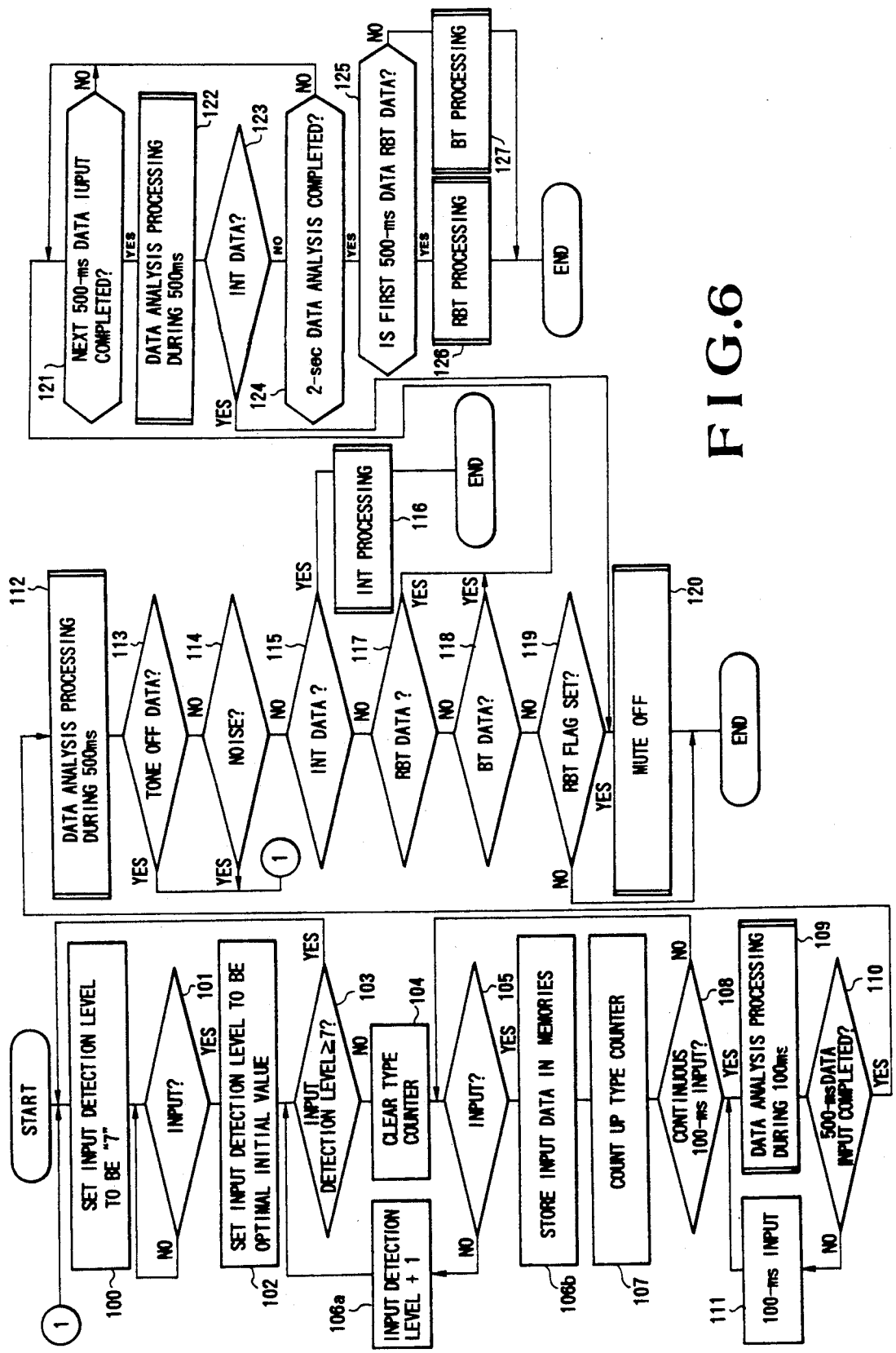

In addition, as described above, the level of an input signal can be varied in units of 5 dB. As shown in Table 4 and FIG. 4, therefore, even if two frequencies within the range of 3dB from the center frequency ($f_O$) are sent at the same time, the two signals can be received in accordance with Q characteristics of the frequencies. That is, by setting the Q value to be low, a detectable range is widened to enable simultaneous reception of signals having a plurality of frequencies. As a result, the number of associated circuits is decreased to realize low power consumption.

TABLE 4

| $f_0$ (Hz) | Q | $f_{min}$ (Hz) | $f_{max}$ (Hz) |
|---|---|---|---|
| 350 | 10 | 315 | 385 |
| 420 | 10 | 378 | 462 |
| 490 | 20 | 465 | 515 |
| 620 | 10 | 558 | 682 |
| 1,150 | 10 | 1,035 | 1,265 |
| 1,566 | 10 | 1,409 | 1,723 |
| 1,800 | 20 | 1,710 | 1,890 |
| 1,912 | 10 | 1,816 | 2,008 |

According to Table 4, the same center frequencies ($f_O$) as those of the various signal tones listed in Table 2 are only 350 Hz and 1,800 Hz, and the frequencies of other signals are set to be different from the center frequencies of the B.P.Fs for the following four reasons.

First, the center frequency 440 Hz of the B.P.F is set to follow 400 to 440 Hz of the RBT shown in Table 2. Similarly, the center frequency 490 Hz of the B.P.F is set to follow 480 to500 Hz. Second, the center frequency 620 Hz of the B.P.F is set to detect a frequency of 600 to 620 Hz. Since, however, a combination of 480 Hz + 620 Hz is often used as the BT, an intermediate value between 600 and 620 Hz is not adopted but only 620 Hz is set. Third, the center frequencies 1,150 Hz and 1,566 Hz of the B.P.F are shifted from the frequency of the INT so as not to be adversely affected by a crosstalk such as an MF signal or another transmission signal. Lastly, since voice frequencies are largely different between individual persons, a frequency corresponding to the voice B.P.F cannot be determined. That is, since unspecified frequencies appear at random in a voice signal while various signal tones are sent at predetermined frequencies and predetermined timings, no predetermined center frequency B.P.F is not set. The center frequencies of the B.P.F are set as described above for the above four reasons.

FIG. 5 shows an arrangement in which the FDT 8 is constituted as a digital filter by using DSPs (Digital Signal Processors).

Referring to FIG. 5, reference numeral 50 denotes a code converter for converting a signal into a linear PCM in accordance with a μ-law; 60, a filter unit for removing frequency components from unnecessary bands; 61 to 68, filter units for discriminating signal frequencies; 71 to 78, integrating processing units for converting discriminated signals into DC voltages; and 81 to 88, signal determination processing units for determining the presence/absence of a signal.

An analog input signal a is sampled in units of 8 kHz and converted into a digital signal by the μ-law PCM. This converted digital signal is subjected to the following high-speed processing by DSPs.

That is, the filter unit 60 removes frequency components from unnecessary bands, and the filter units 61 to 68 discriminate signal frequencies. Each discriminated signal is converted into a DC voltage by a corresponding one of the integrating processing units 71 to 78, and the presence/absence of the signal is determined by a corresponding one of the signal determination processing units 81 to 88. The determined signal is output to a corresponding one of output terminals DET1 to DET8.

FIGS. 6 to 11 are flow charts for explaining operations of this called party response detecting apparatus. The operation of the apparatus will be described in detail below with reference to a basic flow chart shown in FIG. 6. Note that processing shown in this flow chart is executed after an off-hook operation is performed and a destination dial number is transmitted. Since this public telephone set operates by only a station power source, the CNT 7 is activated every 5 ms in order to realize low power consumption. During this 5 ms, the CNT 7 performs processing for about 1 ms and is set in a sleep state of performing no processing for the remaining 4 ms.

In step 100, an input detection level is set to be a maximum of "7" by the control signals CL1 to CL4. In step 101, a logical OR of signals having a certain frequency is input from a telephone line, and the presence/absence of this signal is checked. If the signal is input and "Y (YES)" is determined in step 101, the input detection level is lowered to be an optimal initial value in step 102, and whether the input detection level is "7" or more is checked in step 103. In this case, since the input detection level is smaller than "7", "N (NO)" is determined in step 103. Therefore, a type counter (to be described later) is cleared in step 104, and the presence of an input is checked again in step 105. This type counter is constituted by counters for the INT, RBT, and BT tones and TONE OFF counter indicating a toneless state. When a signal having a certain frequency is input every 5 ms, this signal is determined on the basis of a predetermined output pattern, i.e., a relationship between a frequency and a signal tone shown in Table 3 (determining means), and a corresponding type counter is counted up.

If no input is present and "N" is determined in step 105, the input detection level is incremented by one in step 106a, and whether the input detection level is "7" or more is checked again in step 103. If the level is "7" or more, the flow returns to step 100. If the level is less than "7", the flow advances to step 104. If an input is detected and "Y" is determined in step 105, it is determined that the input detection level is set at an optimal level. Therefore, detection of an input signal is performed on the basis of this optimal level from now on. Input data corresponding to each frequency of the input signal is stored in the memory 20 every 5 ms in step 106b, and this input data is checked in step 107. If the input data is present in step 107, a corresponding type counter is counted up. In step 108, completion of 100-ms continuous data input (continuous signal detecting means) is checked. In this case, since this program is activated every 5 ms, a time period of 100 ms means that the program is activated 20 times and data is input in each activation.

If "N" is determined in step 108, the flow returns to step 105. If 100-ms continuous input is present and "Y" is determined in step 108, data analysis processing (partial analyzing means) for 100 ms (to be described later is performed in step 109. Subsequently, in step 110, whether 500-ms data input is completed, i.e., whether the 100-ms continuous data input described above is successively performed five times is checked. If "N" in step 110, the 100-ms continuous data input is performed in step 111, and the flow returns to step 109. That is, if data input during 500 ms is finished and "Y" is determined in step 109, analysis processing (total analyzing means) for data received during 500 ms (to be described later) is performed in step 112.

The received data is checked (checking means) by processing from step 113. That is, if TONE OFF data or noise is determined by the input data analysis, "Y" is determined in each of steps 113 and 114. In this case, since input is performed again, the flow returns to step 100. If "N" is determined in each of steps 113 and 114, whether INT data is present is checked in step 115. If "Y" is determined in step 115, INT processing (to be described later) is performed in step 116. If "N" is determined in step 115, whether RBT data is present and whether BT data is present are checked in steps 117 and 118, respectively. If no corresponding data is present and "N" is determined in each of steps 117 and 118, whether an RBT flag is set is checked in step 119. Note that the RBT flag is set during RBT processing to be described later.

If the RBT flag is set and "Y" is determined in step 119, a called party response is determined, and MUTE OFF processing is performed in step 120. That is, the mute signal MUT is transmitted to the TKC 5 to release a short circuit of the transmitter T to start conversation with the destination and to start storage of coins. If "N" is determined in step 119, the processing is immediately ended.

If "Y" is determined in step 117 or 118, i.e., if the RBT or BT data is present, these tone data are successively input. In step 121, completion of the next 500-ms data input is checked. If the input is completed and "Y" is determined in step 121, 500-ms data analysis processing is performed in step 122. If it is determined in step 123 that INT data is present, the MUTE OFF processing is performed to start conversation in step 120. If "N" is determined in step 123, completion of analysis of data received for two seconds corresponding to completion of four-time 500-ms data analysis processing is checked in step 124. If "N" in step 124, the flow returns to step 121. If two-sec input data analysis is completed and "Y" is determined in step 124, whether data input during the first 500 ms is RBT data is checked in step 125. If "Y" in step 125, RBT processing is executed in step 126. If "N" in step 126, BT processing is executed in step 127.

Figure 7:
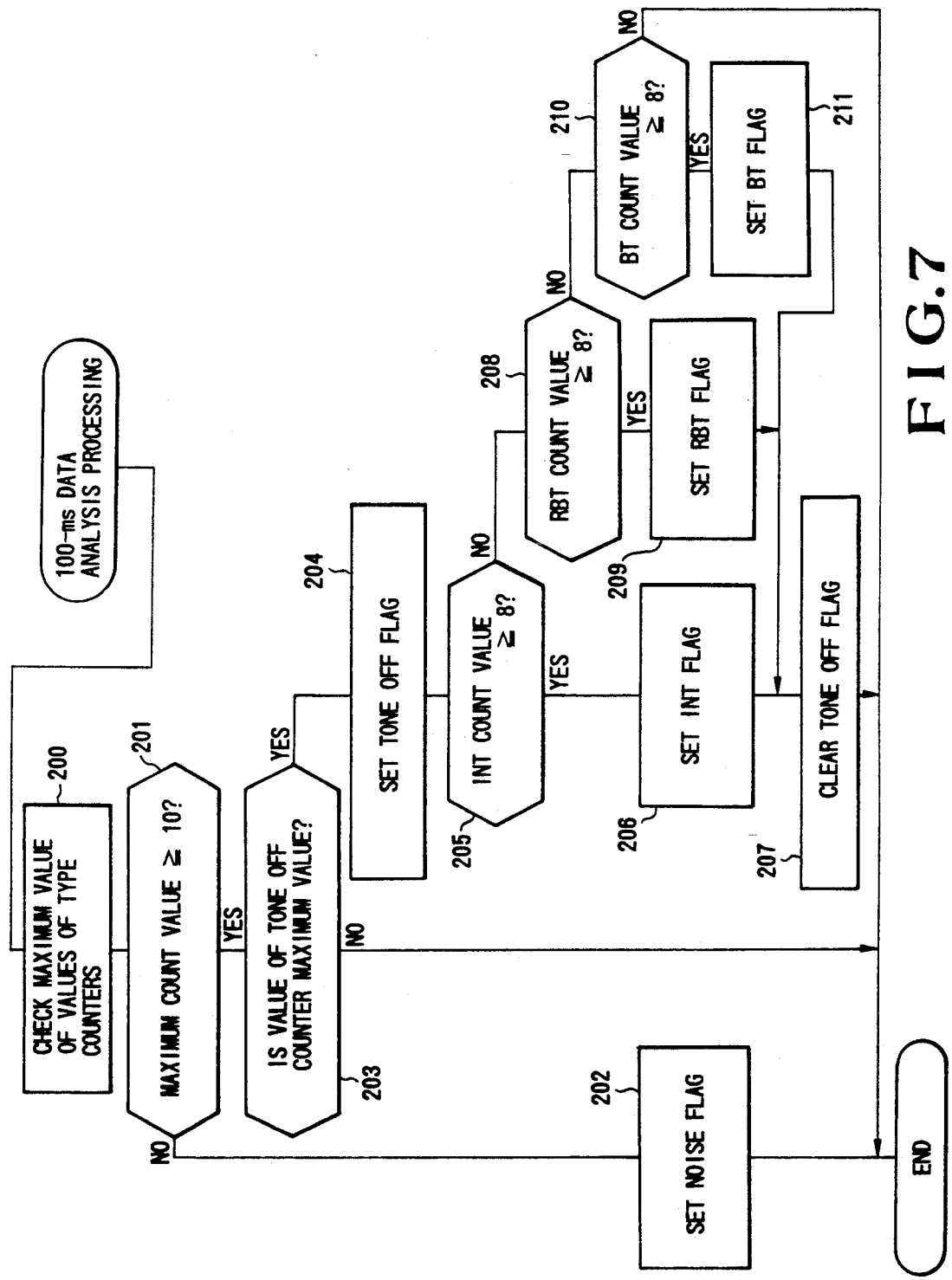

FIG. 7 is a flow chart for explaining an operation of analyzing data input during 100 ms described above. First, in step 200, a maximum count value is checked from the values of the respective type counters, and a flag (temporary signal type) corresponding to the checked value is set. In step 201, whether the maximum count value is 10 or more is checked.

In this case, if only one type counter is counted up upon inputting of data, the value of this type counter is assumed to be a maximum of 20. If, however, the value is less than 10 and "N" is determined in step 201, it is determined that noise is input. In step 202, therefore, a noise flag is set, and the operation is ended.

If the count value is 20 or more and "Y" is determined in step 201, it is checked in step 203 whether the value of a TONE OFF counter indicating a toneless state is maximum of all the values of the type counters. If the value of the TONE OFF counter is not the maximum value, the operation is ended without changing the previously set flag. If the value of the TONE OFF counter is maximum and "Y" is set in step 202, a TONE OFF flag is set in step 204. In step 205, whether the value of the INT counter is eight or more (40 ms or more during 100 ms, i.e., 40% or more) is checked. If the value is eight or more in step 205, an INT flag is set in place of the previously set flag in step 206, and the TONE OFF flag is cleared in step 207. If "N" in step 205, it is checked in step 208 whether the value of the RBT counter is eight or more. If the value is eight or more in step 208, an RBT flag is set in place of the previously set flag in step 209. If "N" in step 208, it is checked in step 210 whether the value of the BT counter is eight or more. If "N" in step 210, the operation is immediately ended. If the value is eight or more and "Y" is determined in step 210, a BT flag is set in step 211 in place of the previously set flag, the processing in step 207 is executed, and the operation is ended.

FIG. 8 is a flow chart for explaining analysis processing for data input during 500 ms.

First, majority decision analysis processing is performed in step 300. In this processing, the flags individually set in the 100-ms data analysis processing described above are classified, and a signal tone (representative signal type) corresponding to a flag having a highest occurrence is determined. If a plurality of flags have the same occurrence, a signal tone is determined on the basis of predetermined combination conditions. Subsequently, in step 301, analysis processing is performed for an ON/OFF pattern of the input data, e.g., a tone pattern in which BT data is present for 0.5 seconds and toneless data is present for 0.5 seconds in the case of the BT. In step 302, count processing is performed for an occurrence of a specific frequency of the tone obtained by the majority decision processing and the tone pattern analysis processing, i.e., occurrence information of the specific frequency stored in the memory 20 every 5 ms. In step 303, total analysis processing is performed on the basis of the above processing results to determined the type of data (i.e., one representative signal type of the data such as the RBT data and the BT data) input during 500 ms. Note that in step 303, the total analysis processing is performed on the basis of at least two factors of the majority decision processing, the tone pattern analysis result, and the contents stored in the memory 20.

FIG. 9 is a flow chart for explaining INT processing to be executed after the data input during 500 ms is analyzed as described above. First, data is input for another 200 ms in step 400. In step 401, whether data having a frequency of 1 kHz or more is present for 175 ms among the data input during 200 ms is checked. If "Y" is determined in step 401, i.e., an INT signal is continuously sent, INT detection is performed in step 402. If "N" in step 401, whether an RBT flag is set is checked in step 403. If the RBT flag is set and "Y" is determined in step 403, i.e., a called party response is detected, MUTE OFF processing is performed to start mutual conversation in step 404. If "N" in step 403, the processing is immediately finished. Note that in this embodiment, conversation is always started after the RBT is transmitted. Therefore, the MUTE OFF processing is performed after setting of the RBT flag is determined.

FIG. 10 is a flow chart for explaining RBT processing. First, in step 500, it is checked whether the RBT is present for one second or more during two seconds in the data analysis for each 500 ms described above. If "Y" is determined in step 500, i.e., the RBT is detected, an RBT flag is set, and whether a MUTE OFF state is set is subsequently checked in step 502. If the MUTE OFF state is set and "Y" is determined in step 502, the MUTE processing is performed again in step 503 to short-circuit the transmitter T, thereby ending the processing without executing conversation. If MUTE OFF state is not set in step 502, the processing is immediately ended.

If no RBT is present for one second or more during two seconds in step 500, whether data coincides with a special RBT pattern registered beforehand is checked in step 510. If the coincidence is obtained and "Y" is determined in step 510, the flow advances to step 501 to step the RBT flag. If the data does not coincide with the special RBT pattern and "N" is determined in step 510, whether the RBT flag is set is checked in step 511. If the RBT flag is set and "Y" is determined in step 511, it is determined that a called party response is detected. In step 512, therefore, the MUTE OFF processing is performed to allow mutual conversation with the destination and start storage of coins.

Figure 11:
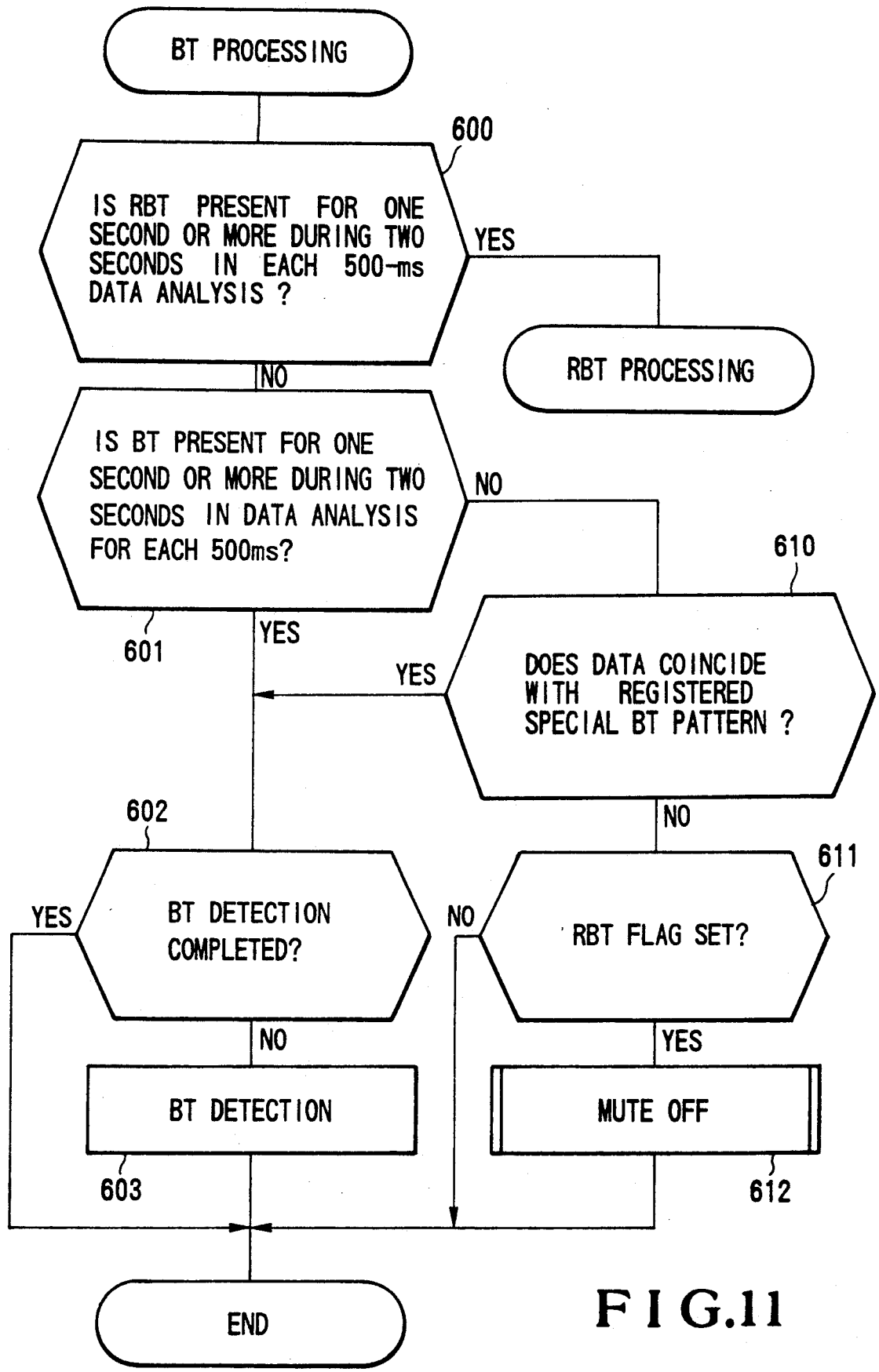

FIG. 11 is a flow chart for explaining BT processing. First, in step 600, it is checked whether the RBT is present for one second or more during two seconds in the data analysis for each 500 ms described above. If "Y" is determined in step 600, i.e., the RBT is detected, the flow advance to the RBT processing described above. If "N" in step 600, it is determined in step 601 whether the BT is present for one second or more during two seconds in the data analysis for each 500 ms. If "Y" is determined in step 601, i.e., the BT is detected, whether BT detection is finished is checked in step 602. If "N" in step 602, BT detection is continuously performed in step 603. If "Y" in step 602, the processing is immediately ended.

If no BT is present for one second or more during two seconds in step 601, whether the data coincides with a special BT pattern stored beforehand is checked in step 610. If the coincidence is obtained and "Y" is determined in step 610, the flow advances to step 602 to perform determination of BT detection. If the data does not coincide with the special pattern and "N" is determined in step 610, whether the RBT flag is set is checked in step 611. If the RBT flag is set and "Y" is determined in step 611, it is determined that a called party response is detected. In step 612, therefore, the MUTE OFF processing is performed to allow mutual conversation and start storage of coins.

As has been described above, according to the called party response detecting apparatus of the present invention, specific frequency components included in a plurality of signal tones coming from a telephone line are checked in units of fundamental frequencies to determine signal types on the basis of predetermined output patterns, temporary signal types are determined in accordance with a plurality of partial analyses performed by dividing a predetermined time period, and a representative signal type is determined on the basis of the temporary signal types to analyze various signal tones and a called party response. Therefore, various signal tones and a called party response can be correctly discriminated from each other, i.e., the called party response can be correctly detected.

What is claimed is:

1. A called party response detecting apparatus of a terminal equipment connected to a telephone line from which a signal representing a called party response is not sent, comprising:

an input terminal;

timing means for establishing a fundamental time period, a plurality of partial analysis time periods each comprising a plurality of fundamental time periods, and an analysis time period comprising said plurality of partial analysis time periods;

a plurality of filter units, each having an input commonly connected to said input terminal, for detecting specific frequency components included in and corresponding to a plurality of signal tones coming from said telephone line during each of said plurality of fundamental time periods;

a memory unit for storing the presence/absence of each output from said filter units for each of said plurality of fundamental time periods;

determining means for determining a signal type on the basis of a predetermined output pattern by checking data representing the presence/absence of each output from said filter units for each of said plurality of fundamental periods; and analyzing means for analyzing various signal tones and a called party response on the basis of occurrences of signal type outputs during said analysis time period, said analyzing means including partial analyzing means for determining temporary signal types by a partial analyses performed during each partial analysis time period by a plurality of units analyzing means, and total analyzing means for determining a representative signal type on the basis of a majority of the temporary signal types determined by said partial analyzing means.

2. An apparatus according to claim 1, wherein said partial analyzing means determines the signal type output having a maximum count value supplied from said determining means as a temporary signal type.

3. An apparatus according to claim 1, wherein said total analyzing means determines the representative signal type on the basis of generated patterns of the temporary signal types determined by said partial analyzing means.

4. An apparatus according to claim 1
wherein said total analyzing means determines a total representative signal type on the basis of at least two factors of the majority decision result of the temporary signal type outputs from said partial analyzing means, the generated patterns thereof, and the contents of said memory unit.

5. An apparatus according to claim 1, further comprising continuous signal detecting means for detecting continuation of a logical OR output from said filter units for said analysis time period to allow said analyzing means to perform an analysis operation for said analysis time period.

6. An apparatus according to claim 2, wherein said partial analyzing means temporarily determines noise when the maximum count value is not more than a predetermined value.

7. An apparatus according to claim 2, wherein when the signal type having the maximum count value indicates toneless an a count value of a specific signal type is not less than a predetermined value, said partial analyzing means determines the specific signal type as a temporary signal type.

8. An apparatus according to claim 1, wherein said total analyzing means determines a representative signal type on the basis of predetermined conditions of combinations when the decision by majority is split.

9. An apparatus according to claim 1, further comprising checking means for performing a check corresponding to the signal type of a signal tone determined by said total analyzing means.

10. An apparatus according to claim 9, wherein said checking means has a special data pattern for each signal type and unconditionally continues the processing for the signal type when the special data pattern coincides with a generated pattern of the signal type upon checking.

11. An apparatus according to claim 1, wherein each of said plurality of filter units is constituted by a digital filter using a DSP (Digital Signal Processor).

12. An apparatus according to claim 1 further including counting means for counting occurrences of specific frequencies on the basis of data stored in said memory unit; and wherein said total analyzing means analyzes various signal tones and a called party response in accordance with outputs from said determining means and said counting means.

* * * * *